S. G. GOTUZZO.
BUCKET CHAIN ELEVATOR.
APPLICATION FILED OCT. 10, 1911.
1,073,803.
Patented Sept. 23, 1913.
2 SHEETS—SHEET 1.
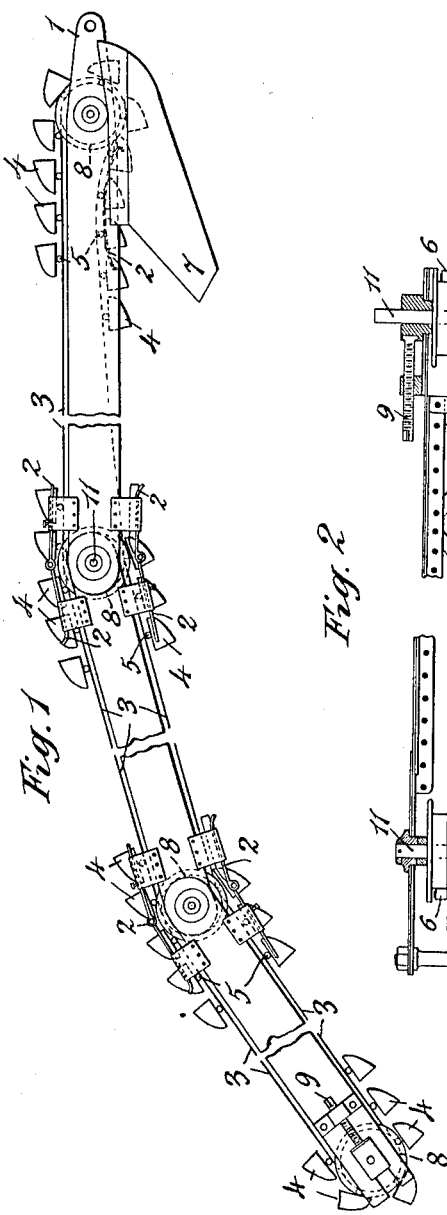
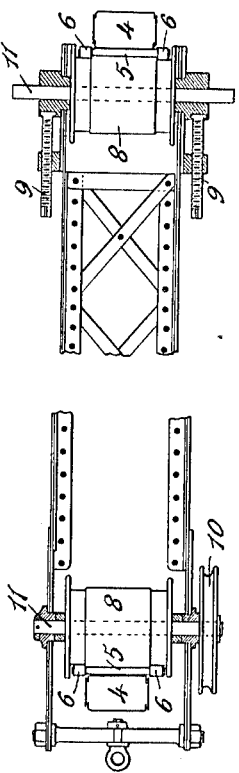
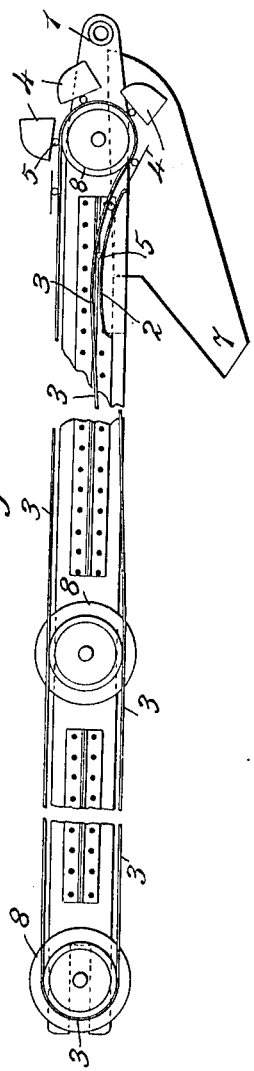
WITNESSES:
John C. Sanders
Leon Spring
INVENTOR:
Silvio Giuseppe Gotuzzo
BY
ATTY.

S. G. GOTUZZO.
BUCKET CHAIN ELEVATOR.
APPLICATION FILED OCT. 10, 1911.

1,073,803.

Patented Sept. 23, 1913.

2 SHEETS—SHEET 2.

WITNESSES:
John C. Sanders
Leon Spring

INVENTOR:
Silvio Giuseppe Gotuzzo
BY
ATTY.

COLUMBIA PLANOGRAPH CO., WASHINGTON, D. C.

UNITED STATES PATENT OFFICE.

SILVIO GIUSEPPE GOTUZZO, OF LEGHORN, ITALY.

BUCKET-CHAIN ELEVATOR.

1,073,803.   Specification of Letters Patent.   Patented Sept. 23, 1913.

Application filed October 10, 1911. Serial No. 653,913.

*To all whom it may concern:*

Be it known that I, SILVIO GIUSEPPE GOTUZZO, a subject of the King of Italy, residing at Leghorn, Italy, have invented certain new and useful Improvements in Bucket-Chain Elevators, of which the following is a specification.

My present invention has for its object to provide certain improvements in bucket chain elevators, especially for loading and unloading bulk goods on and from ships, etc., the said improvements consisting essentially in the rigid support or frame of the bucket chain being broken and swiveled at intervals so that the path of the bucket chain may be altered at will, or according to requirements, from the straight line to any broken or curved line.

Figure 4:
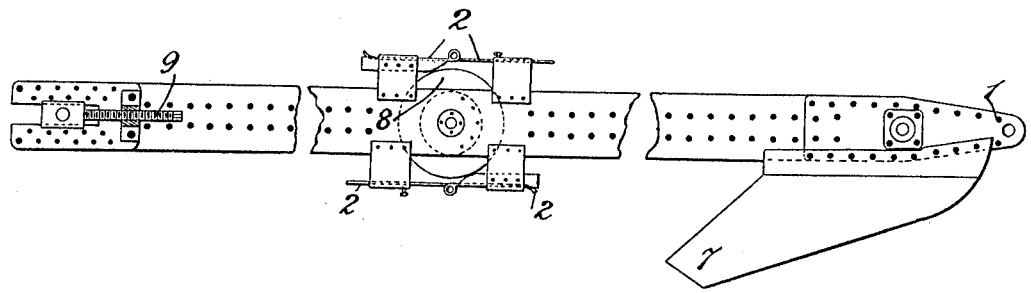
Figure 5:
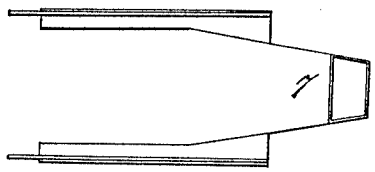
Figure 6:
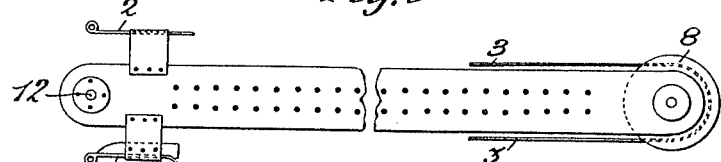
Figure 7:
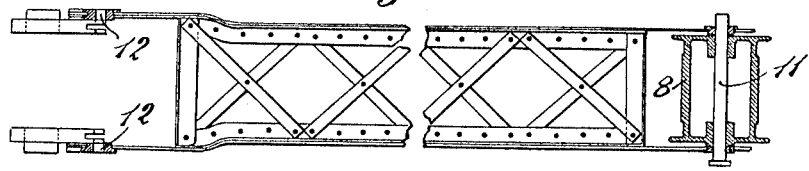

Figure 1 of the drawing shows a fragmentary view of the bucket chain device, Fig. 2 is a sectional view of the two ends of the device, Fig. 3 is a side view of Fig. 2 showing the guides adapted to hold the belt in position. Fig. 4 is a side view of Fig. 2 showing the guides 2—2 which hold the belt in position. Fig. 5 is a plan view of the discharge canal, Fig. 6 shows the pieces for lengthening the device, and Fig. 7 is a plan view of Fig. 6.

In the said drawing, 1 is the attachment device for suspending the device in the place where it is to work; 2 are guides to hold the chain or belt 3 in place, the said guides being straight and articulated in correspondence with the pivot of the drums, and sliding in grooves provided in the guide plates so as to be able to adapt themselves to the different inclinations of the bucket chain device; 4 are the buckets attached to the belt by means of pivots; 5 are the pivots carrying at their ends rollers 6 to eliminate the friction produced by the car sliding in the guides 2; 7 is the discharge canal, 8 the supporting drums of belt 3, 9 the belt tighteners, 10 the drum operating pulleys, 11 the connecting pivots of the different sections, and 12 the holes for the said pivots.

Owing to the articulated nature of the chain supporting frame, the above described bucket elevator may be given any desired position in or out of a straight line so as to be capable of being used for loading and unloading goods on or from ships, carts, coal-bunkers, etc., through any broken, zig-zag, curved, or other irregular path.

Having now fully described my said invention, and the manner in which the same is to be performed, what I claim and intend to secure by Letters Patent of the United States is:

A bucket chain elevating device comprising in combination an endless flexible member, buckets carried thereon, supporting drums for said member, a plurality of frames pivoted to one another and supporting said drums and said member, guiding plates provided with grooves and articulated guides for said endless member slidingly engaging said grooves, said guides being articulated at points corresponding to the points of pivotal connection of said frames.

In testimony whereof I have signed my name to this specification in the presence of two subscribing witnesses.

SILVIO GIUSEPPE GOTUZZO.

Witnesses:
 ANTONIO MANIONDI,
 UMBERTO PAPERINI.

Copies of this patent may be obtained for five cents each, by addressing the "Commissioner of Patents, Washington, D. C."